United States Patent [19]

Buma et al.

[11] Patent Number: 5,797,595
[45] Date of Patent: Aug. 25, 1998

[54] AIR SUSPENSION DEVICE OF INPUT FORCE SEPARATION TYPE OF VEHICLE, HAVING AIR CHAMBER COMBINED BELOW SHOCK ABSORBER

[75] Inventors: Shuuichi Buma; Katsuyuki Sano; Tetsuaki Kawata, all of Toyota, Japan

[73] Assignee: Toyota Jidosha Kabushiki Kaisha, Toyota, Japan

[21] Appl. No.: 627,994

[22] Filed: Apr. 4, 1996

[30] Foreign Application Priority Data

Apr. 19, 1995 [JP] Japan ................................. 7-117790

[51] Int. Cl.⁶ .................................................... F16F 9/04
[52] U.S. Cl. ....................... 267/64.27; 267/64.24; 267/64.21; 267/220
[58] Field of Search ........................ 267/64.27, 64.26, 267/64.28, 64.24, 64.11, 64.12, 122, 219, 220; 188/298, 322.19; 280/712, 714

[56] References Cited

U.S. PATENT DOCUMENTS

| | | | |
|---|---|---|---|
| 3,653,651 | 4/1972 | Allinquant et al. | 267/64.24 |
| 4,616,811 | 10/1986 | Buma | 267/64.24 X |
| 4,635,745 | 1/1987 | Myers et al. | |
| 4,671,323 | 6/1987 | Buma | 267/64.21 |

FOREIGN PATENT DOCUMENTS

| | | |
|---|---|---|
| A-2014593 | 10/1970 | Germany. |
| A-1-3610144 | 10/1987 | Germany. |
| A-61-99731 | 5/1986 | Japan. |
| A-2-31907 | 2/1990 | Japan. |
| Y2-5-4590 | 2/1993 | Japan. |

OTHER PUBLICATIONS

JP-A-61-99731 abstract, vol. 10, No. 277 (M-519) [2333], Sep. 19, 1986, "Vibration Insulating Device", Isao Watanabe et al.
Patent Abstracts of Japan, vol. 10, No. 311 (M-528), Oct. 23, 1986, "Suspension For Car", Takema Shuichi.
JP-A-52-106520 abstract, vol. 001, No. 161 (M-053), Dec. 20, 1977, "Supension System", Shiro Yuasa.

*Primary Examiner*—Robert J. Oberleitner
*Assistant Examiner*—Pamela J. Lipka
*Attorney, Agent, or Firm*—Oliff & Berridge, PLC

[57] ABSTRACT

In an air suspension device of a vehicle having a parallel combination of an air spring and a shock absorber, a housing to provide the air spring has an upper half cylindrical portion of a smaller diameter and a lower half cylindrical portion of a larger diameter; the shock absorber is coaxially disposed in the housing such that its upper axial end is connected with an upper end of the housing via a first elastic cushion while its lower axial end is axially extended out of the lower end of the housing to be connected with a wheel suspension member of the vehicle; an annular flange is coaxially mounted to the lower axial end of the shock absorber; an annular rolling diaphragm is extended between the open lower end of the housing and the annular flange so as to define a closed air chamber with the housing means; and a second elastic cushion is attached to the upper end of the housing for connection with a body of the vehicle.

11 Claims, 9 Drawing Sheets

AIR SUSPENSION DEVICE OF INPUT FORCE SEPARATION TYPE OF VEHICLE, HAVING AIR CHAMBER COMBINED BELOW SHOCK ABSORBER

BACKGROUND OF THE INVENTION

1. Field of the Invention

The present invention relates to a suspension of a vehicle such as an automobile, and more particularly to an air suspension device of an input force separation type of a vehicle such as an automobile.

2. Description of the Prior Art

As an air suspension device of a vehicle such as an automobile, there is conventionally known an air suspension device of an input force separation type, in which a shock absorber of a cylinder-piston construction and an air spring of a cup and diaphragm construction are coaxially combined such that an inverse cup-shaped air chamber housing of the air spring forms an upper end of the suspension device, while a rod portion of a piston member of the shock absorber is mounted at its upper end to a central portion of the air chamber housing via a first rubber cushion, said piston rod extending downward from said upper end into a cylinder member of the shock absorber, and an annular rolling diaphragm is extended between the lower annular edge of the inverse cup-shaped air chamber housing and a corresponding annular portion of the cylindrical outer surface of the cylinder, thereby forming an air chamber whose volume changes according to up and down movements of the cylinder relative to the piston and therefore relative to the air chamber housing, wherein the lower end of the cylinder provides the lower end of the air suspension device, as shown, for example, in Japanese Laid-open Publication 2-31907. When an air suspension device made of such an assembly of the cylinder-piston means and the variable volume air chamber means is mounted in a vehicle, with the upper end thereof being connected to a corresponding body portion of the vehicle via a second rubber cushion, while the lower end thereof being connected with a wheel suspension member, the vehicle body is elastically suspended via a series connection of the air cushion provided by the variable volume air chamber means and said second rubber cushion, while a vibrational movement of the vehicle body relative to the vehicle wheel is damped by the cylinder-piston shock absorber via a series connection of said first and second rubber cushions. Although the cylinder-piston shock absorber is generally transmissive to high frequency small amplitude vibrations applied to the vehicle wheel from the road surface, and although the cylinder-piston shock absorber is provided in parallel with the air cushion means in the input force separation type air suspension device, it is avoided by the provision of said first rubber cushion between the upper end of the piston rod and the air chamber housing that the high frequency small amplitude vibrations are substantially transmitted to the vehicle body.

However, since the air chamber of the air spring requires a relatively large diameter to support a relatively heavy load with a desired high softness, the inverse cup-shaped air chamber housing must be generally designed to have a relatively large diameter having an upper bottom of a correspondingly large area. In this connection, through various experimental researches for the developments of vehicle suspensions conducted by the inventors of the present application, it was found that a drum-type vibration of the large upper bottom of the air chamber housing energized by the high frequency small amplitude vibrations transmitted through the cylinder-piston shock absorber and said first rubber cushion is forming a substantial source of a noise which prevents a further improvement of the comfortableness of the cabin.

SUMMARY OF THE INVENTION

Therefore, it is a principal object of the present invention to provide an air suspension device which is improved to obviate the above-mentioned noise source due to the drum-type vibration of the large upper bottom of the inverse cup-shaped air chamber housing of the conventional input force separation type air suspension device.

According to the present invention, the above-mentioned principal object is accomplished by an air suspension device of a vehicle, comprising a housing means having an upper half cylindrical portion of a first diameter and a lower half cylindrical portion of a second diameter substantially larger than said first diameter and coaxially connected with said upper portion along an axis and open downward at a lower end thereof, a first elastic cushion means, a shock absorber including a cylinder and a piston engaged with one another to be shiftable relative to one another and coaxially disposed in said housing along said axis such that an upper axial end thereof is connected with an upper end of said housing means via said first elastic cushion means while a lower axial end thereof is axially extended out of the lower end of said housing to be connected with a suspension member of the vehicle, an annular flange means coaxially mounted to said lower axial end of said shock absorber, an annular rolling diaphragm means extended between said open lower end of said housing means and said annular flange means so as to define a closed air chamber with said housing means, and a second elastic cushion means attached to the upper end of said housing means for connection thereof with a body of the vehicle.

By the air chamber housing means being constructed to have an upper half cylindrical portion of a first diameter and a lower half cylindrical portion of a second diameter substantially larger than said first diameter and coaxially connected with said upper portion, the upper end of the housing means through which the upper end of the shock absorber is connected with the vehicle body can be reduced to have a small area and rigid construction not to make a drum-type vibration, while a large cross sectional area of the air chamber required to support a heavy load at a desired elastic softness is available by the larger diameter lower half portion of the air chamber housing means.

Further, by the upper half portion of the air chamber housing means being reduced to have such a small diameter required only to receive the shock absorber of the cylinder-piston type therein, while a large diameter required for supporting a heavy load with a high elastic softness being provided by the lower half portion of the air chamber housing, the space required for the mounting of the upper half portion of the air suspension device, which generally interferes with a space for the engine auxiliaries or luggage, is decreased, so that more space is available for the engine room or the luggage compartment.

In the above-mentioned construction of the air suspension device, said second elastic cushion means may include an annular rubber cushion member coaxial with said axis and formed with an annular slit extending transversely relative to said axis from an outer circumference thereof radially inward to have a gradually decreasing axial width such that a substantially circular sectional area is defined by a border line across which opposite faces defining said slit changes between a mutually contacted condition and a mutually removed condition, said substantially circular area changing its area and its center according to changes of an axial compression load applied thereto.

By such an arrangement, when the shock absorber is biased to incline about the center of said first elastic cushion means due to a transverse and/or longitudinal shifting of the lower end thereof connected with the wheel suspension member of the vehicle according to the bounding or rebounding of the vehicle wheel, the housing means of the air spring can also be virtually inclined about the center of said first elastic cushion means so as to maintain the axial alignment with the shock absorber, whereby it is avoided that the annular rolling diaphragm is applied with a transverse biasing.

In such an arrangement, said annular rubber cushion member may have such a geometry that, when the wheel suspension member connected with the lower axial end of said shock absorber is at a neutral position thereof, said center of said substantially circular area is substantially aligned with said axis, and when the wheel suspension member connected with the lower axial end of said shock absorber is at a position bounded from the neutral position thereof, said center of said substantially circular area is shifted on a first transverse side of said axis, and further when the wheel suspension member connected with the lower axial end of said shock absorber is at a position rebounded from the neutral position thereof, said center of said substantially circular area is shifted on a second transverse side of said axis opposite to said first side.

As an embodiment, said shock absorber may have a piston rod extending upward from the cylinder such that the piston rod is connected with said housing means via said first elastic cushion means at an upper end thereof, said cylinder being provided by a cylinder means partly telescopically received in said upper half cylindrical portion of said housing means at an upper axial portion thereof, with said annular flange means being mounted around said cylinder means at an axial position thereof located in said lower half cylindrical portion of said housing means. In this case, said annular flange means may have an annular cavity open upward and having an inner diameter larger than the diameter of an inside wall of said upper half cylindrical portion of said housing means. Further, said housing means may be an axially joined combination of a sub-chamber member providing said upper half cylindrical portion thereof and a main chamber member providing said lower half cylindrical portion. In these constructions, an annular elastic bound stopper may be provided around said piston rod in said upper half cylindrical portion of said housing means adjacent the upper end thereof to be axially compressed by an upper end of said cylinder means when said cylinder means moves upward relative to said piston beyond a predetermined relative position. In this case, it is desirable that said annular elastic bound stopper is generally tapered downward with a gradual reduction of radial thickness thereof.

As an alternative embodiment, said shock absorber may have a piston rod extending downward from the cylinder such that the piston rod is connected with the wheel suspension member of the vehicle at a lower end thereof, said cylinder being provided by a cylinder means which also provides said upper half cylindrical portion of said housing means, with said annular flange means being mounted around said piston rod at a lower end portion thereof. In such an arrangement, said cylinder means may have a lower end extending in said lower half cylindrical portion of said housing means, and said annular flange means may have an annular cavity open upward and having an inner diameter larger than the diameter of an outside wall surface of said lower end of said cylinder means. Also in this embodiment, an annular elastic bound stopper may be provided around said piston rod in said annular cavity to be axially compressed by a lower end of said cylinder means when said piston carrying said annular flange means moves upward relative to said cylinder means beyond a predetermined relative position. In this case, it is again desirable that said annular elastic bound stopper is generally tapered upward with a gradual reduction of radial thickness thereof.

BRIEF DESCRIPTION OF THE DRAWINGS

In the accompanying drawings.

DESCRIPTION OF THE PREFERRED EMBODIMENTS

In the following the present invention will be described in more detail in the form of some preferred embodiments with reference to the accompanying drawings.

Figure 1:
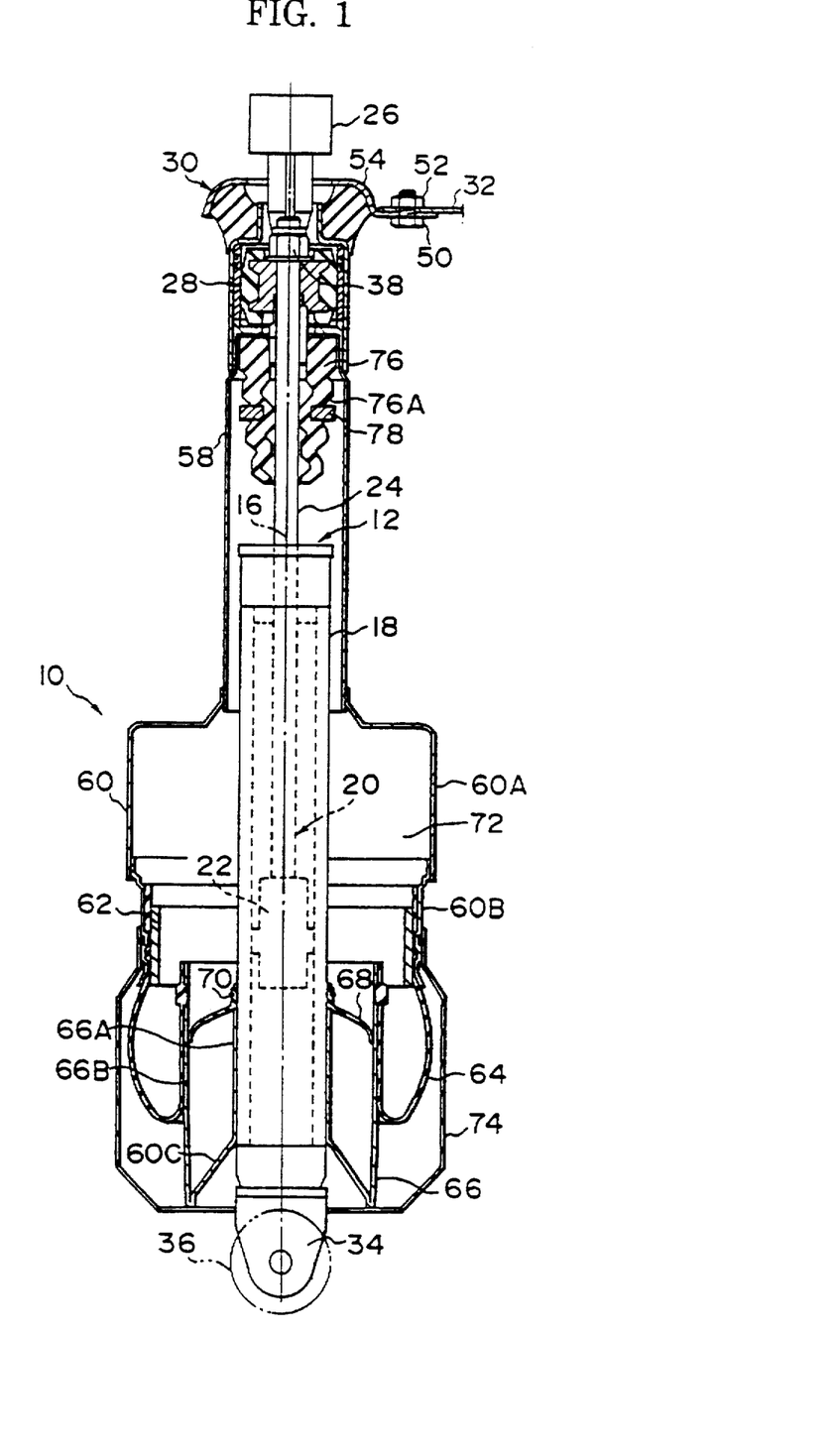
FIG. 1 is a longitudinal sectional view showing a first embodiment of the air suspension device according to the present invention constructed in an input force separation type.
Figure 2:
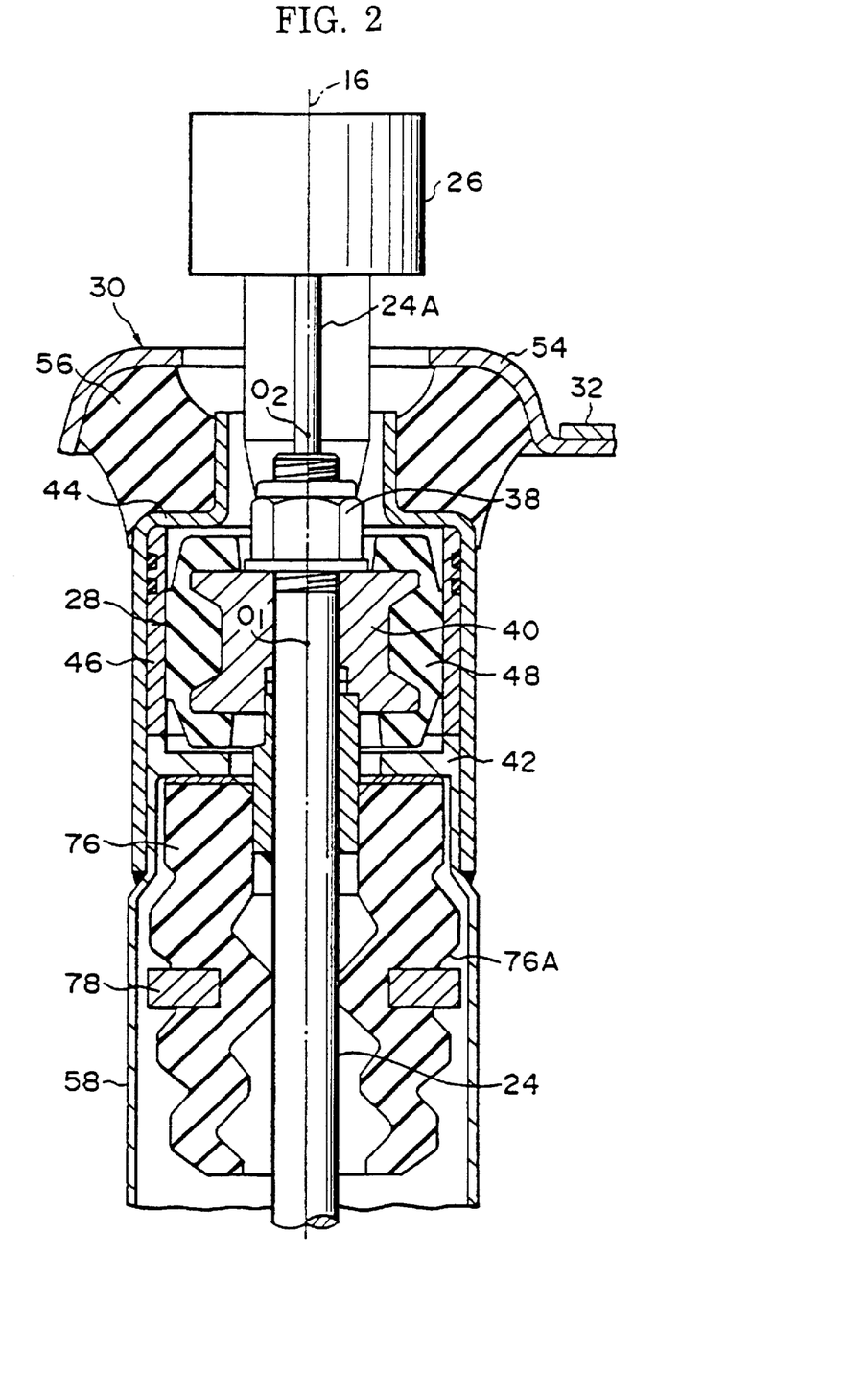
FIG. 2 is an enlarged longitudinal sectional view showing an essential part of the first embodiment.

Referring to FIG. 1 showing a longitudinal sectional view of a first embodiment of the air suspension device constructed as a separation type according to the present invention, and FIG. 2 showing an enlarged longitudinal sectional view of an essential part of said first embodiment, 10 designates an air spring integral with a damping force variable type shock absorber 12. The shock absorber 12 includes a cylinder 18 and a piston 20 engaged with one another to be relatively slidable along an axis 16. The piston 20 includes a piston body 22 and a piston rod 24 integrally connected therewith and extending along the axis 16. At the inside of the piston body 22 there is provided a damping force control valve (not shown), from which there extends a control rod 24A, such that the damping force control valve is operated by an actuator 26 via the control rod 24A to increase or decrease the damping force.

The piston rod 24 is mounted at its upper end to a vehicle body 32 via a rubber bush means 28 which constructs a first elastic connection means and an upper mount means 30 which constructs a second elastic connection means, while the cylinder 18 is mounted at its lower end to a vehicle wheel suspension member (not shown) via an integrally mounted bracket 34 and a rubber bush means 36. The rubber bush means 28 includes an inside cylinder member 40, an outside cylinder member 46 and a rubber bush member 48, all arranged coaxially, the inside cylinder member 40 being fixed to the upper end of the piston rod 24 by a nut 38, while the outer cylinder member 46 is pressed into an inside cylinder member 44 of the upper mount means 30, with the rubber bush member 48 being disposed between the inside cylinder 40 and the outside cylinder member 46. The upper mount means 30 is constructed by the inside cylinder member 44, an outer cylinder member 54 and a rubber bush member 56, all arranged coaxial, wherein the outer cylinder member 54 is fixed at its flange portion to the vehicle body 32 by a bolt 50 and a nut 52.

The air spring 10 comprises a housing partially constructed by a sub-chamber member 58 having a substantially cylindrical portion extending along the axis 16 and an upper end portion formed as a spacer means 42 pressed into the inside of the inside cylinder member 44 of the upper mount means 30 and fixed with a lower end of the inside cylinder member 44 by welding. The sub-chamber member 58 has an inner diameter larger than the outer diameter of the cylinder 18, so as to allow the cylinder 18 to enter therein along the axis 16, and extends downward to a position located below the upper end of the cylinder 18 at a neutral condition of the cylinder-piston assembly, or more desirably, to a position located below the upper end of the cylinder 18 at a full rebound condition of the cylinder-piston assembly.

Figure 3A:
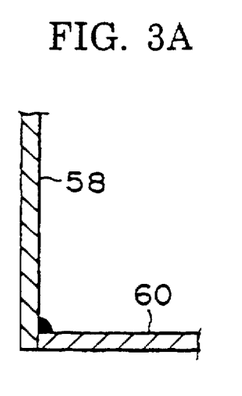
FIGS. 3A, 3B and 3C are each an enlarge longitudinal sectional view showing other constructions of the connecting portion between the sub-chamber member and the main chamber member.
Figure 3B:
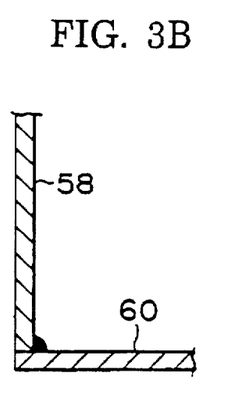
Figure 3C:
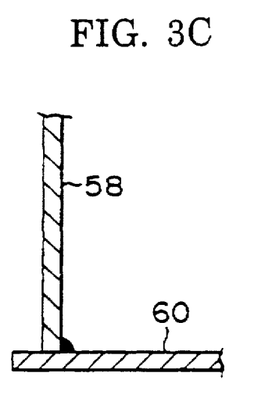

The sub-chamber member 58 is connected at its lower end, by welding, with an upper end of a main chamber member 60 constructing a lower half portion of the housing of the air spring and having a larger diameter than the sub-chamber. The main chamber member 60 includes a larger diameter cylindrical portion 60A and a smaller diameter cylindrical portion 60B, both extending along the axis 16 and integrally connected with one another. Although in the shown embodiment the upper edge of the main chamber member 60 is positioned a little above the lower edge of the sub-chamber member 58, the upper edge of the main chamber member 60 may be just aligned with the lower edge of the sub-chamber member 58 as shown in FIGS. 3A and 3B. In this connection, the upper end of the main chamber member should not have any portion to protrude to the inside of the sub-chamber member 58 as shown in FIG. 3C.

An annular flange member 66 is mounted to the lower end of the cylinder 18, such that it includes an inside cylindrical portion 66A, an outside cylindrical portion 66B, both being coaxial, and an end wall portion 66C integrally connected with the inside and outside cylindrical portions at lower ends thereof. The upper end of the outside cylindrical portion 66B defines an open end of the annular flange member. The inner diameter of the outside cylindrical portion 66B is determined to be larger than the inner diameter of the lower end of the sub-chamber member 58. Particularly in the shown embodiment, the difference between the inner diameter of the outside cylindrical portion 66B and the inner diameter of the lower end of the sub-chamber member 58 is so determined that, even when the shock absorber is assembled in a vehicle as inclined relative to a vertical line, a vertical line passing through the lowest point of the lower edge of the inner surface of the sub-chamber member 58 is on the inside of the open end of the outside cylindrical portion 66B.

A substantially frust-conically shaped oil seal cover 68 made of an elastic material such as rubber is provided between the inside cylindrical portion 66A and the outside cylindrical portion 66B, with an inner annular edge portion thereof being fastened around the cylinder 18 by a fastening ring member 70, while an outer annular edge portion thereof is in a light free contact with the inner surface of the outside cylindrical portion 66B at a position below the open end. An annular rolling diaphragm member 64 is provided such that an outer flange portion thereof is fastened to the inner surface of the cylindrical portion 60B as held by a cylindrical clamp member 62 and an inner flange portion thereof is fastened to the outside cylindrical portion 66B as elastically firmly clamped therearound by a bead portion integrally formed therein. The annular rolling diaphragm 64 defines an air chamber 72 of the air spring 10 together with the shock absorber 12, sub-chamber member 58, main chamber member 60 and the annular flange member 66. A dust cover 74 enclosing the diaphragm member 64 is provided with its annular edge portion being mounted around the outer surface of the lower end portion of the smaller diameter cylindrical portion 60B of the main chamber portion 60.

A bound stopper 76 is provided at the inside of the sub-chamber member 58, as engaged around and extending along the piston rod 24 and fixed at its upper end to the upper end of the sub-chamber member 58. The radial thickness of the bound stopper 76 is gradually decreased downward from its upper end, while the outer diameter thereof is generally gradually decreased downward from its upper end with a waving which defines a plurality of annular grooves. A metal ring 78 is engaged in one of those grooves.

When a vehicle wheel not shown in the figure bounds and rebounds, the cylinder 18 and the piston 20 reciprocate relative to one another, whereby a damping force is generated according to the amount of opening of the damping force control valve incorporated in the piston body 22 but not shown in the figure. At the same time, as the annular flange member 66 displaces relative to the assembly of the sub-chamber member 58 and the main chamber member 60 along the axis 16, the volume of the air chamber 72 changes, whereby the air spring 10 generates a spring force.

The above-mentioned spring force is transmitted to the vehicle body via the sub-chamber member 58 and the upper mount means 30, while the above-mentioned damping force is transmitted to the sub-chamber member 58 via the piston rod 24 and the rubber bush member 28, and then further to the vehicle body via the upper mount means 30. Therefore, in the same manner as in the conventional input force separation type air suspension device, the oscillation of the air spring 10 is transmitted to the vehicle body via the upper mount means 30, while the oscillation of the piston rod 24 of the shock absorber 12 is first transmitted to the sub-chamber member 58 via the rubber bush member 28, and then to the vehicle body via the upper mount means 30, so that a high frequency, small amplitude oscillation is damped by the rubber bush, whereby the riding comfortableness of the vehicle is more improved than in the construction which connects the piston rod directly with the chamber member.

The sub-chamber member 58 has an upper end construction of a relatively small diameter which is much less liable to a drum-type vibration energized by a high frequency small amplitude vibration transmitted through the shock absorber 12. A relatively large transverse area required to support a heavy load at a high softness of the air spring 10 is provided by the main chamber member 60 forming the lower half portion of the air chamber which, in this embodiment, is constructed the assembly of the sub-chamber member 58 and the main chamber member 60. Further, the lower edge of the sub-chamber member 58 has an inner diameter smaller than the inner diameter of the outside cylindrical portion 66B of the annular flange member 66 and extends downward to a position which is located below the upper end of the cylinder 18 at a full rebound condition of the cylinder-piston assembly, so that, even if oil leaked out from the inside of the cylinder 18 through between the upper end of the cylinder 18 and the piston rod 24 and was scattered around due to a centrifugal force during a turn running of the vehicle or due to a bumping of the upper end of the cylinder 18 at the lower end of the bound stopper 76 during a bounding of the vehicle wheel, the scattered oil is caught by the sub-chamber member, so as to flow down along the inside surface thereof and to drop from the lower edge thereof into the annular space of the annular flange member 66, whereby it is avoided that the diaphragm 64 is degraded by an attachment of oil thereto.

Particularly in the shown embodiment, since the oil cover 68 is provided at the annular opening of the annular flange member 66, the oil dropped into the annular opening of the annular flange member moves below the oil cover around an elastic outer periphery of the oil cover so as to be caught in the annular space of the annular flange member. Therefore, even when the thus stored oil is applied with an upward force due to an oscillation caused by the driving of the vehicle, it is definitely prevented that the oil spills out of the annular flange member, whereby the diaphragm is protected from being degraded by oil. The amount of such an oil leakage would be normally very small, if it occurred, not to occupy any substantial part of the inside space of the annular flange member 66 over a substantial length of time.

Figure 4:
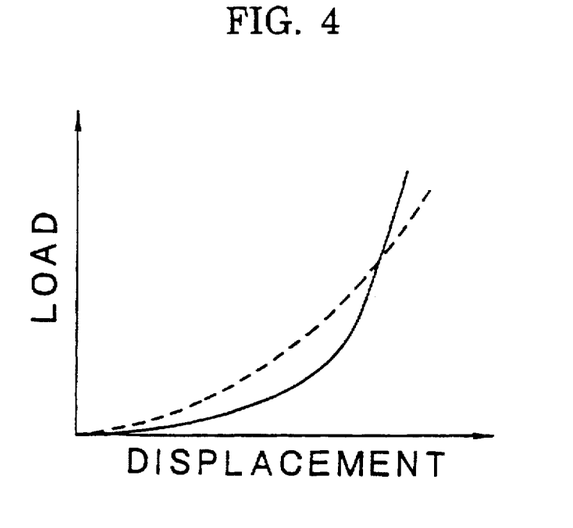
FIG. 4 is a graph showing the spring characteristic of the bound stopper of the first embodiment.

Further, since the outer diameter of the bound stopper 76 is generally gradually decreased from its upper end toward its lower end with a gradual decrease of the radial thickness thereof, so as to leave a generally gradually downward increasing annular clearance against the inner surface of the sub-chamber member 58, when the vehicle wheel bounds beyond a predetermined amount, the reaction force against the amount of compression of the bound stopper due to the bounding increases steeply as shown by a solid performance curve in FIG. 4, because the radial outside expansion of the bound stopper is restricted by the inner surface of the sub-chamber member 58, in contrast to a moderately increasing performance curve shown by a broken line expected to be available without such a tapering construction. Therefore, a shock which would occur at a moment when the upper end of the cylinder touches the lower end of the bound stopper is decreased, while an over bounding of the vehicle wheel is more effectively suppressed, thereby contributing to a further improvement of the riding comfortableness of the vehicle.

Further, in the shown embodiment, even when the piston rod 24 inclines relative to the sub-chamber member 58 to pivot around a central point $O_1$ of the rubber bush member 28 under the elasticity thereof according to a longitudinally forward or rearward or sideward shifting of the lower end of the shock absorber 12 accompanying a bounding or rebounding of the vehicle wheel, since the sub-chamber member 58 is connected with the vehicle body 32 via the upper mount means 30 such that the sub-chamber member 58 can pivot around a central point $O_2$ of the upper mount means 30 under the elasticity thereof, it is avoided that the diaphragm 64 is applied with a heavy side biasing force.

Figure 5:
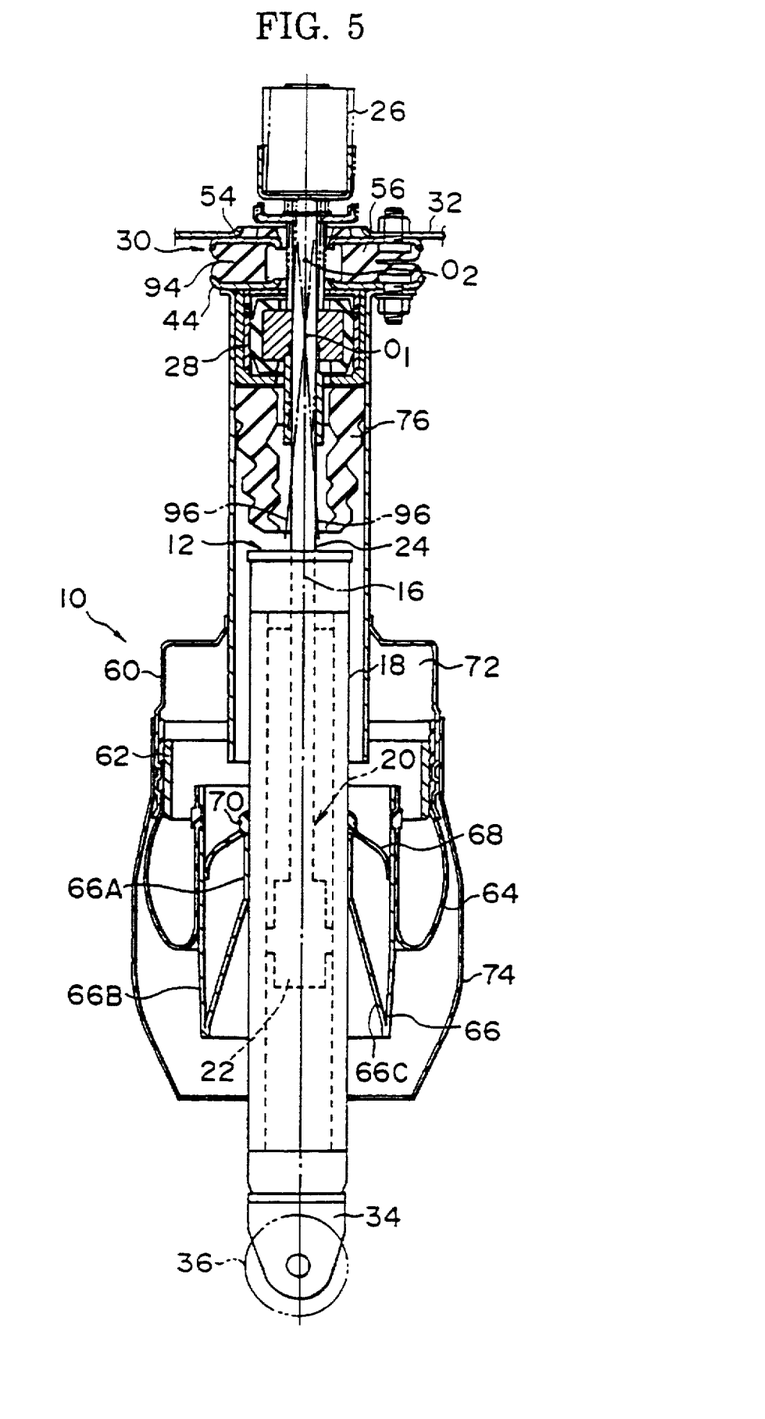
FIG. 5 is a longitudinal sectional view showing a second embodiment of the air suspension device according to the present invention constructed in an input force ration type.
Figure 6:
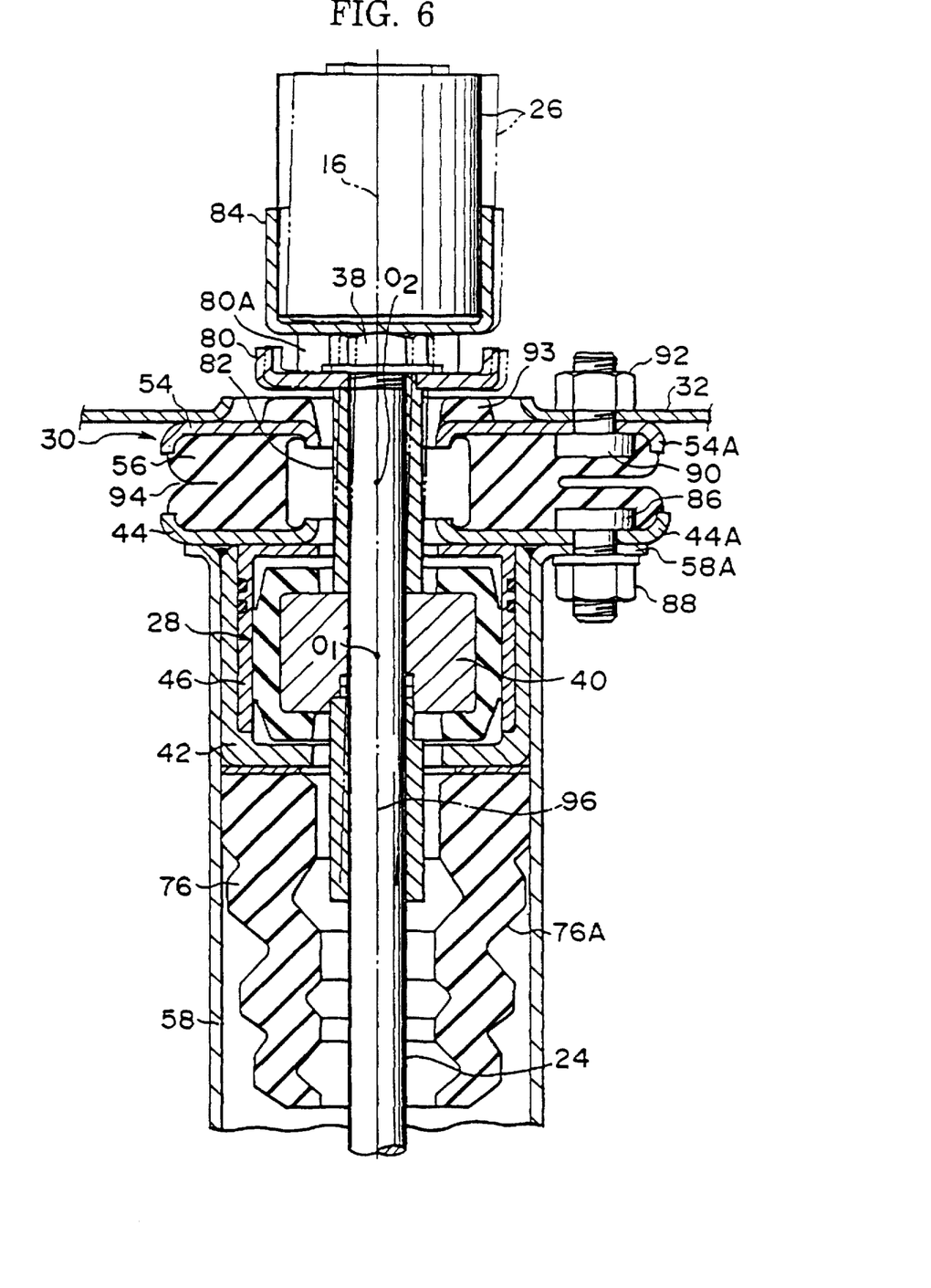
FIG. 6 is an enlarged longitudinal sectional view showing an essential part of the second embodiment.

FIG. 5 is a longitudinal sectional view showing a second embodiment of the air suspension device constructed as an input force separation type according to the present invention, and FIG. 6 is an enlarged partial longitudinal sectional view showing an essential part of the second embodiment. In these figures, the portions corresponding to those shown in FIGS. 1 and 2 are designated by the same reference numerals as in those figures.

In this embodiment, the inside cylinder 40 of the rubber bush means 28 working as the first elastic connection means is fixed to the upper end portion of the piston rod 24 by a stopper plate 80 and a retainer collar 82 with fastening by the nut 38. The stopper plate 80 has a bracket 80A formed integral therewith, to which is fixed a support member 84 for supporting the actuator 26. The outside cylinder 46 of the rubber bush means 28 is pressed into the inside of the spacer 42 which is fixed at its upper outer peripheral portion to an upper inner peripheral portion of the sub-chamber member 58 by welding. A flange portion 58A is integrally provided at the upper end of the sub-chamber member 58.

On the other hand, the upper mount means 30 working as the second elastic connection means includes a lower retainer plate 44 and an upper retainer plate 54, both extending substantially perpendicularly to the axis 16, and a rubber bush member 56 disposed between these two retainer plates. The lower retainer plate 44 is clamped at its flange portion 44A to the flange portion 58A of the sub-chamber member 58 by a bolt 86 and a nut 88. The upper retainer plate 54 is clamped at its flange portion 54A to the vehicle body 32 by a bolt 90 and a nut 92. Along an inner peripheral portion of the upper surface of the upper retainer plate 54 there is fixedly mounted a rubber cushion 93 which is adapted to cooperate with the stopper plate 80.

The rubber bush member 56 is formed with an annular slit 94 cut into an outer circumferential portion thereof along a plane extending perpendicular to the axis 16 at a center of the thickness thereof. As shown with an exaggeration in FIGS. 7A and 7B by a plan sectional view and a longitudinal sectional view, in a free, unloaded condition of the upper mount means 30, the center point Os of the radially inner bottom of the slit is offset to the outboard side from the axis 16, whereby the radial depth of the slit is the largest on the inboard side and the smallest on the outboard side. The width of the slit is gradually increased from the radially inner bottom toward the radially outer opening thereof. When the vehicle wheel is at the neutral position, with a predetermined vertical preload being applied to the rubber bush member 56, the outer periphery 94C bordering an area in which the upper wall 94A and the lower wall 94B of the slit contact with one another follows a circle centered at a point Oc which is substantially aligned with the axis 16, as shown in FIGS. 8A and 8B, i.e., the periphery circle 94C is centered at the axis 16. When the vertical load applied to the rubber bush member 56 increases from the above-mentioned preload, the periphery circle 94C shifts generally to the other side relative to the axis 16, i.e. inboard side, so that the center of the periphery circle 94C is positioned as shown by Oc in FIGS. 9A and 9B.

Thus, according to the second embodiment, in addition to the same functions and effects as obtained in the above-mentioned first embodiment, the center of the axial force transmitted through the upper mount means 30 is shifted sideward due to the bounding and rebounding of the vehicle wheel, such that the axis 96 of the assembly of the sub-chamber member 58 and the main chamber member 60 is inclined virtually to pivot about the center $O_1$ so as to conform with the pivoting of the axis 16 of the shock absorber 12 about the center $O_1$ due to the bounding and rebounding of the vehicle wheel, whereby the assembly of the sub-chamber member 58 and the main chamber member 60, with the annular flange member 66, shifts substantially in alignment with the shock absorber 12 even when the shock absorber inclines accompanying the bounding and rebounding of the vehicle wheel, whereby it is effectively avoided that the diaphragm 64 is applied with a heavy side biasing force during the bounding and rebounding of the vehicle wheel.

In more detail, although not shown in the figure, if a suspension arm connected with the lower end of the cylinder 18 of the shock absorber 12 extends downward from its inboard end to its outboard end when the vehicle wheel is at its neutral position, the lower end of the cylinder 18 is shifted outboard relative to its neutral position as the vehicle wheel bounds, while it is shifted inboard relative to its neutral position as the vehicle wheel rebounds.

Figure 7A:
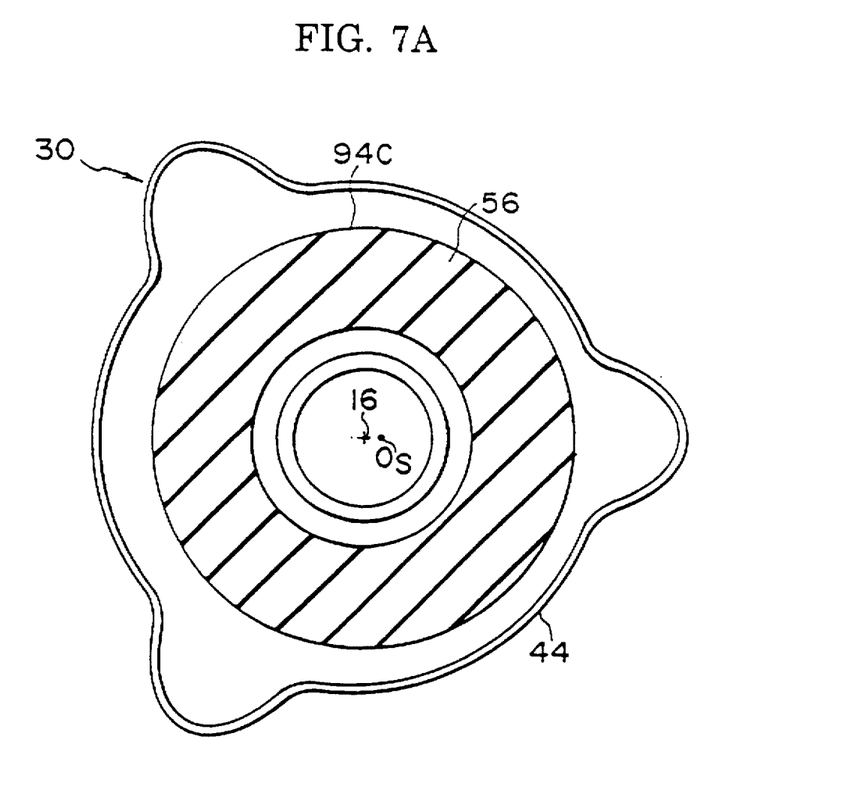
FIGS. 7A and 7B are a plan sectional view and a longitudinal sectional view showing the upper mount means of the second embodiment in its free, unloaded condition, respectively.
Figure 7B:
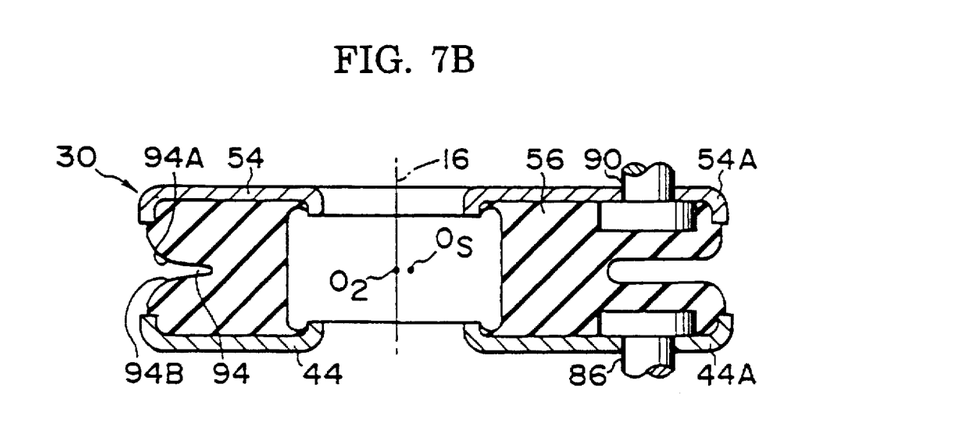
Figure 8A:
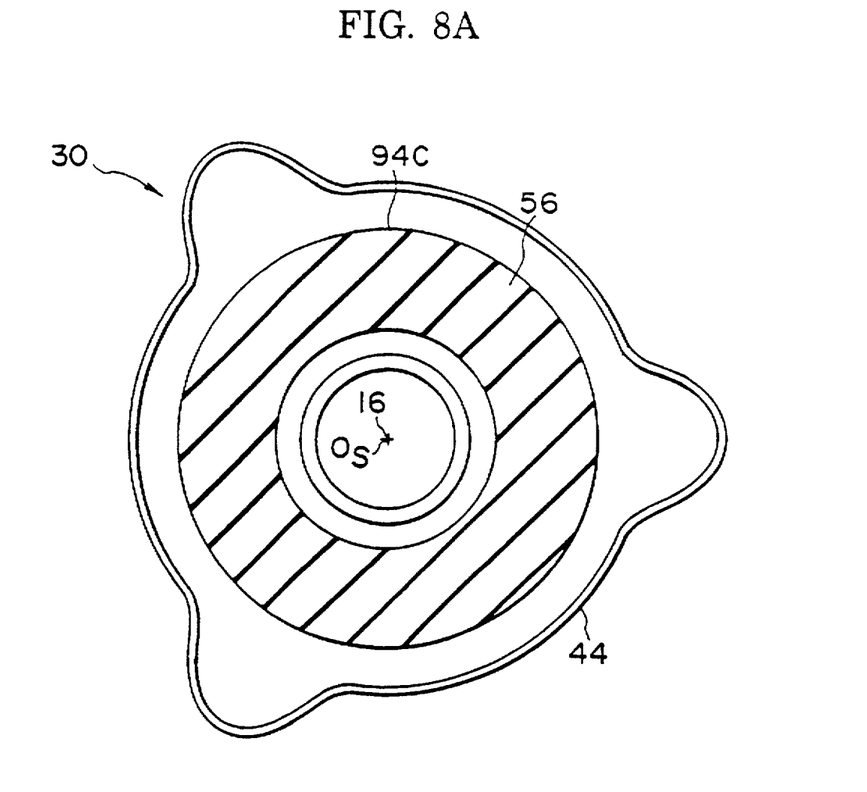
FIGS. 8A and 8B are a plan sectional view and a longitudinal sectional view showing the upper mount means of the second embodiments in the condition where the vehicle wheel is at its neutral position, respectively.
Figure 8B:
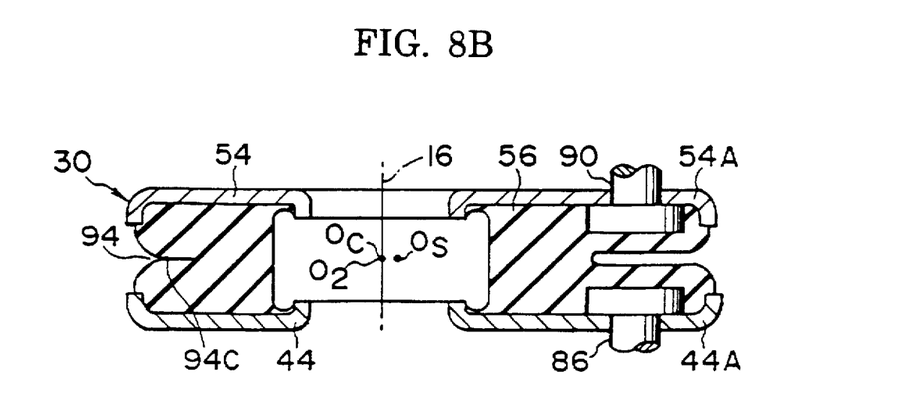

Since the compression load of the upper mount means 30 decreases according to the rebounding of the vehicle wheel, the contact area of the slit 94 becomes smaller than that at the vehicle wheel neutral condition shown FIGS. 8A and 8B, with the center Os of the outer periphery 94C shifting outboard from the point aligned with the axis 16 as shown in FIGS. 8A and 8B to a point close to or coinciding with the point Os of the free unloaded condition shown in FIG. 7A and 7B, so that the axis 96 of the assembly of the sub-chamber member 58 and the main chamber member 60 shifts as if it pivots about the point $O_1$ in the clockwise direction when viewed in FIG. 5 so as substantially to align with the axis 16 of the shock absorber 12 pivoting about the center $O_1$ in the same clockwise direction due to rebounding of the vehicle wheel.

Figure 9A:
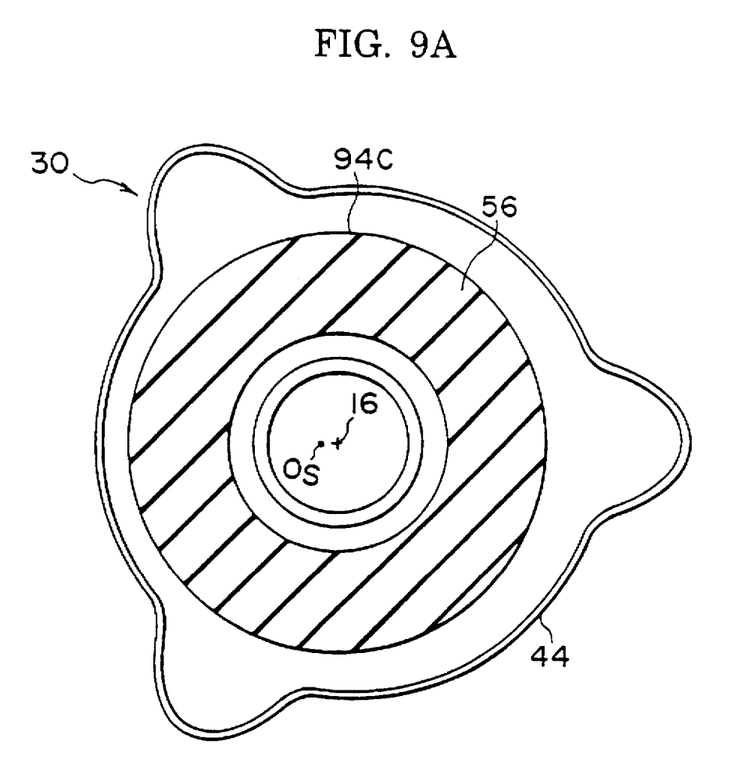
FIGS. 9A and 9B are a plan sectional view and a longitudinal sectional view of the upper mount means of the second embodiment in the condition where the vehicle wheel is bounded, respectively.
Figure 9B:
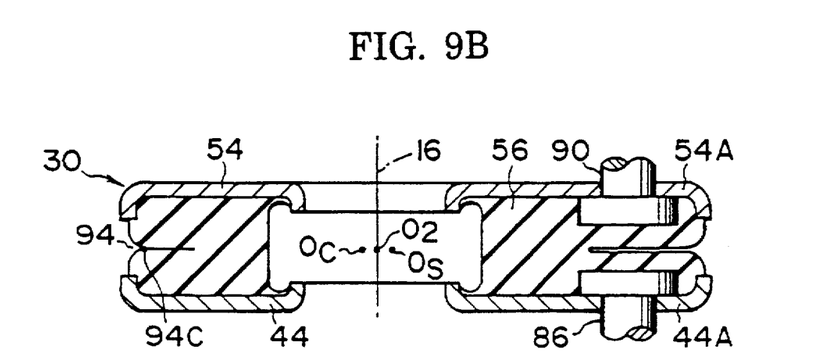

Conversely, since the compression load of the upper mount means 30 increases according to the bounding of the vehicle wheel, the contact area at the slit 94 becomes larger than that at the vehicle wheel neutral position shown in FIGS. 9A and 9B, whereby the center Os of the outer periphery 94C shifts inboard from the point aligned with the axis 16 as shown in FIGS. 8A and 8B to such a point as shown in FIG. 9A and 9B, so that the axis 96 of the assembly of the sub-chamber member 58 and the main chamber member 60 shifts as if it pivots about the point $O_1$ in the anti-clockwise direction when viewed in FIG. 5 so as substantially to align with the axis 16 of the shock absorber 12 pivoting in the same anti-clockwise direction about the center $O_1$.

It is to be noted that, when the center $O_2$ of the upper mount means 30 is positioned above the center $O_1$ of the rubber bush member 28, the direction of the offset of the center Os of the slit 94 is to be opposite to the direction of the shifting of the lower end of the shock absorber 12 according to the bounding and rebounding of the vehicle wheel, but when the center $O_2$ is positioned below the center $O_1$, the direction of the offset of the center Os is to be the same as the direction of the shifting of the lower end of the shock absorber. Further, the offset amount of the center Os needs to be determined according to the amount of shifting of the lower end of the shock absorber, the length of the shock absorber 12 and the distance between the centers $O_1$ and $O_2$. Further, when the lower end of the shock absorber also shifts longitudinally according to the bounding and rebounding of the vehicle wheel, the center Os may also be offset longitudinally relative to the axis 16.

Although the slit 94 is formed at a center of the thickness of the rubber bush member 56 in the shown embodiment, the slit or a comparable notch or the like effective to change the contact area according to changes of the axial compression so as correspondingly to change the reaction force against the axial compression may be formed in the area between the upper surface of the rubber bush member and the lower surface of the upper retainer plate 54 or in the area between the lower surface of the rubber bush member and the upper surface of the lower retainer plate 44.

Figure 10:
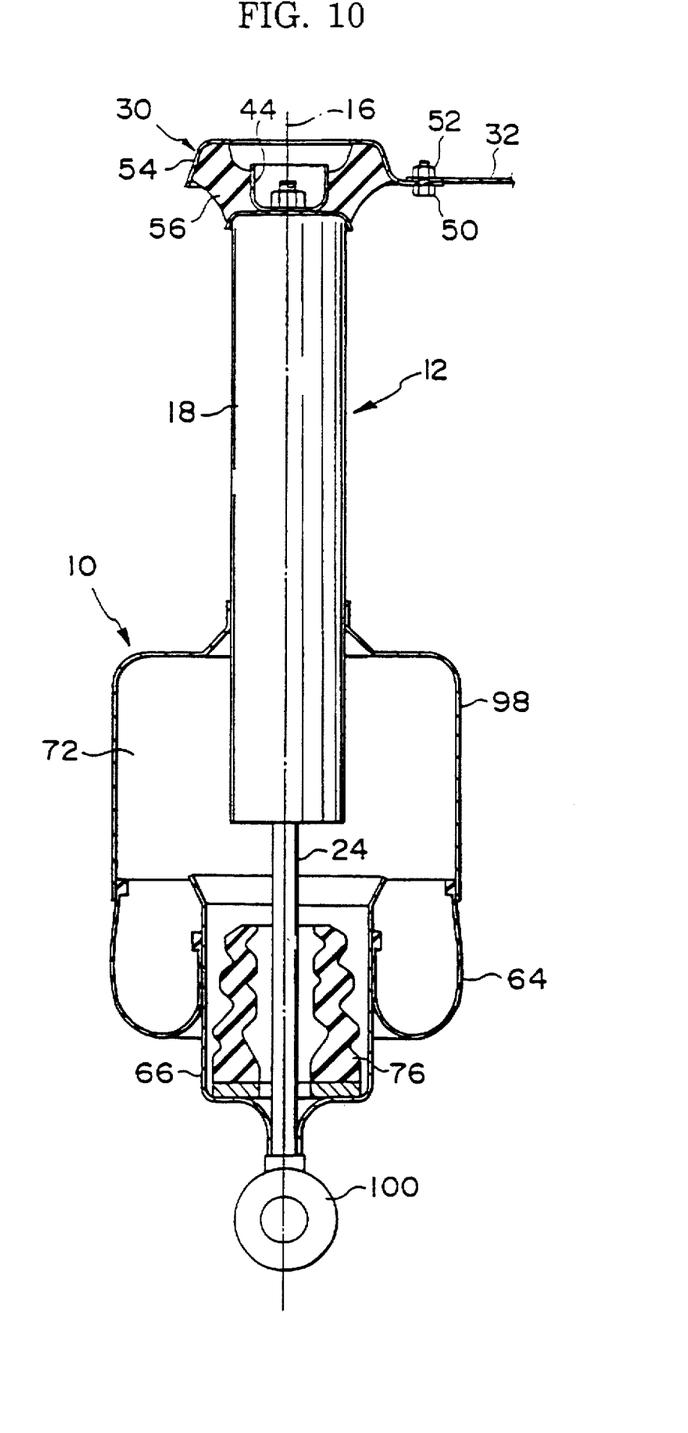
FIG. 10 is a longitudinal sectional view showing a third embodiment of the air suspension device according to the present invention in a somewhat simplified manner.

FIG. 10 is a longitudinal sectional view showing a third embodiment of the air suspension device according to the present invention. Also in FIG. 10, the portions corresponding to those shown in FIGS. 1 and 2 or FIGS. 5 and 6 are designated by the same reference numerals.

In this third embodiment, the shock absorber 12 is so constructed that the cylinder 18 is positioned above the piston rod 24. The cylinder 18 is connected with the vehicle body 30 at its upper end via an upper mount means 30 which includes an inner cylinder member 44 fixed to the upper end of the cylinder 18 by a nut, an outer cylinder member 54 fixed to the vehicle body 32 by a bolt 50 and a nut 52, and a rubber bush member 56 disposed between the inner and outer cylinder members.

The air spring 10 comprises a cylindrical chamber member 98 fixed at its upper end to the cylinder 18 and substantially open downward, an annular flange member 66 fixed at its lower end to the lower end of the piston rod 24 via a connection member 100 mounted to the lower end of the piston rod by being screwed therein, and an annular rolling diaphragm 64 extended between the chamber member 98 and the annular flange member 66 so as to define an air chamber 72 together with the shock absorber.

The annular flange member 66 has a substantially cylindrical shape open upward, and has an outer diameter smaller than the inner diameter of the cylindrical portion of the chamber member 98, and an inner diameter larger than the outer diameter of the cylinder 18. A tubular bound stopper 76 is mounted in the annular flange member 66 as disposed around the piston rod 24 and fixed to the piston rod 24 at the lower end thereof. The longitudinal length of the bound stopper is shorter than the length of the cylindrical portion of the annular flange member. The outside diameter of the lower end portion of the bound stopper is slightly smaller than the inner diameter of the cylindrical portion of the annular flange member, and the outer diameter of the bound stopper is generally gradually decreased toward its upper end, with the thickness thereof being gradually decreased toward the upper end.

Thus, according to this third embodiment, the upper half portion of the housing of the air spring having a small diameter is provided by the cylinder 18 of the shock absorber. In this embodiment also, even if oil has leaked out from the inside of the shock absorber 12 through between the lower end of the cylinder 18 and the piston rod 24, the leaked out oil moves downward along the piston rod and is received by the annular flange member 66, whereby it is avoided that the diaphragm 64 is degraded by the attachment of such a leaked out oil. When the vehicle wheel bounds beyond a predetermined amount, the amount of compression deformation of the bound stopper 76 gradually increases as the amount of bounding increases, and when the compression deformation proceeds so far that the diametrical expansion of the bound stopper is restricted by the inner surface of the annular flange member 66, the reaction of the bound stopper increases non-linearly steeply, thereby providing such a performance that the lower end of the cylinder abuts against the upper end of the bound stopper with no shock, thereby improving the riding comfortableness, while any over bounding of the vehicle wheel is effectively prevented, thereby improving the drivability of the vehicle.

This embodiment may also be modified such that the upper end of the chamber member 98 is mounted to the cylinder 18 of the shock absorber by an elastic connection means such as a rubber bush means, and further a dust cover 74 similar to those provided in the first and second embodiments may be provided.

Although the chamber members 58, 60 and 98 and annular flange members 66 are constructed in a cylindrical shape in the shown embodiments, they may be constructed as a polygonal tubular member.

Although the invention has been described in detail with respect to some particular embodiments thereof, it will be apparent for those skilled in the art that other various embodiments are possible within the scope of the present invention.

We claim:

1. An air suspension device of a vehicle, comprising a housing means having an upper half cylindrical portion of a first diameter and a lower half cylindrical portion of a second diameter substantially larger than said first diameter and coaxially connected with said upper half cylindrical portion along an axis and open downward at a lower end thereof, a first elastic cushion means, a shock absorber, said shock absorber including a cylinder and a piston engaged with one another to be shiftable relative to one another and coaxially disposed in said housing means along said axis with a piston rod being axially extended upward out of said cylinder such that an upper axial end of said piston rod is connected with an upper end of said housing means via said first elastic cushion means and at least an upper end portion of said cylinder is telescopically received within said upper half cylindrical portion of said housing means, while a lower axial end of said cylinder is axially extended downward out of the lower end of said lower half cylindrical portion of said housing means to be connected with a wheel suspension member of the vehicle, an annular flange means coaxially mounted to said lower axial end of said cylinders an annular rolling diaphragm means extended between said open lower end of said lower half cylindrical portion of said housing means and said annular flange means so as to define a closed air chamber with said housing means, and a second elastic cushion means attached to the upper end of said housing means for mounting the upper end of said housing means to a body of the vehicle.

2. An air suspension device according to claim 1, wherein said second elastic cushion means includes an annular rubber cushion member coaxial with said axis and formed with an annular slit extending transversely relative to said axis from an outer circumference thereof radially inward to have a gradually decreasing axial width such that a substantially circular sectional area is defined by a border line across which opposite faces defining said slit changes between a mutually contacted condition and a mutually removed condition, said substantially circular area changing its area and its center according to changes of an axial compression load applied thereto.

3. An air suspension device according to claim 2, wherein said annular rubber cushion member has such a geometry that, when the wheel suspension member connected with the lower axial end of said shock absorber is at a neutral position thereof, said center of said substantially circular area is substantially aligned with said axis, and when the wheel suspension member connected with the lower axial end of said shock absorber is at a position bounded from the neutral position thereof, said center of said substantially circular area is shifted on a first transverse side of said axis, and further when the wheel suspension member connected with the lower axial end of said shock absorber is at a position rebounded from the neutral position thereof, said center of said substantially circular area is shifted on a second transverse side of said axis opposite to said first side.

4. An air suspension device according to claim 1, wherein said annular flange means has an annular cavity open upward and having an inner diameter larger than the diameter of an inside wall of said upper half cylindrical portion of said housing means.

5. An air suspension device according to claim 1, wherein said housing means is an axially joined combination of a sub-chamber member providing said upper half cylindrical portion thereof and a main chamber member providing said lower half cylindrical portion.

6. An air suspension device according to claim 1, wherein an annular elastic bound stopper is provided around said piston rod in said upper half cylindrical portion of said housing means adjacent the upper end thereof to be axially compressed by an upper end of said cylinder means when said cylinder means moves upward relative to said piston beyond a predetermined relative position.

7. An air suspension device according to claim 6, wherein said annular elastic bound stopper is generally tapered downward with a gradual reduction of radial thickness thereof.

8. An air suspension device according to claim 1, wherein said shock absorber has a piston rod extending downward from the cylinder such that the piston rod is connected with the wheel suspension member of the vehicle at a lower end thereof, said cylinder being provided by a cylinder means which also provides said upper half cylindrical portion of said housing means, with said annular flange means being mounted around said piston rod at a lower end portion thereof.

9. An air suspension device according to claim 8, wherein said cylinder means has a lower end extending in said lower half cylindrical portion of said housing means, and said annular flange means has an annular cavity open upward and having an inner diameter larger than the diameter of an outside wall surface of said lower end of said cylinder means.

10. An air suspension device according to claim 9, wherein an annular elastic bound stopper is provided around said piston rod in said annular cavity to be axially compressed by a lower end of said cylinder means when said piston carrying said annular flange means moves upward relative to said cylinder means beyond a predetermined relative position.

11. An air suspension device according to claim 10, wherein said annular elastic bound stopper is generally tapered upward with a gradual reduction of radial thickness thereof.

* * * * *